United States Patent Office 3,660,505
Patented May 2, 1972

3,660,505
HINDERED ALKENYL PHENOLS FROM QUINONE METHIDE
William H. Starnes, Jr., Baytown, Tex., assignor to Esso Research and Engineering Company
No Drawing. Filed Aug. 27, 1969, Ser. No. 854,359
Int. Cl. C07c 37/06
U.S. Cl. 260—619 R                    7 Claims

ABSTRACT OF THE DISCLOSURE

The hindered alkenyl phenols having the following structure are useful as antioxidants for hydrocarbons and especially for polyolefins such as polypropylene and are produced by the reaction of a quinone methide with an alkyl or aralkyl Grignard reagent, oxidizing the newly formed 4-alkyl- or aralkylphenol with basic ferricyanide to produce a new quinone methide, and then reacting the quinone methide with a tertiary amine or a trialkylphosphine to produce the following structure:

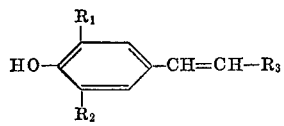

where
$R_1$ and $R_2$ are alkyls having 1 to 8 carbon atoms, preferably a tertiary alkyl; and
$R_3$ is selected from the group consisting of alkyl and aryl.

BACKGROUND OF THE INVENTION

(1) Field of the invention

The present invention is directed to the synthesis of hindered alkenyl phenols of the following general structure:

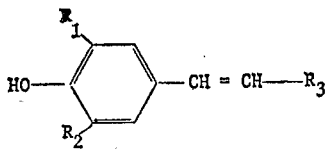

where
$R_1$ and $R_2$ are alkyls having 1 to 8 carbon atoms; and
$R_3$ is selected from the group consisting of alkyl and aryl.

The synthesis of the present invention involves three separate steps. The first is the reaction of quinone methide with an alkyl or aralkyl Grignard reagent; the second step involves the oxidation of the new phenol with basic ferricyanide; and the third step involves the reaction of the new quinone methide with a tertiary amine or a trialkylphosphine.

(2) Prior art

E. Zbiral, O. Saiko, and F. Wessely, Monatshefte für Chemie, 95, 512 (1964); Chem. Abstracts, 61, 5525 (1964); Chem. Abstracts, 61, 5525 (1964); A. Nickon and B. R. Aaronoff, Journal of Organic Chemistry, 27, 3379 (1962); 29, 3014 (1964); H. D. Becker, ibid., 34, 1211 (1969).

SUMMARY OF THE INVENTION

The present invention is directed to the synthesis of hindered alkenyl phenols of the following structure:

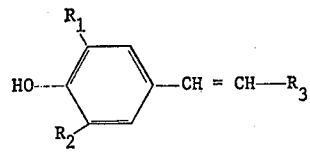

where
$R_1$ and $R_2$ are alkyls having 1 to 8 carbon atoms, and
$R_3$ is selected from the group consisting of alkyl and aryl.

The synthesis method of the present invention may be briefly described by the following reactions:

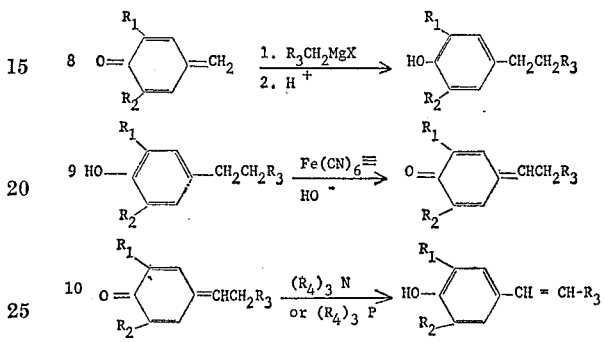

where
$R_1$, $R_2$, and $R_4$ are alkyls having 1 to 8 carbon atoms; X is Cl, Br, or I; and
$R_3$ is selected from the group consisting of alkyl and aryl.

DESCRIPTION OF THE PREFERRED EMBODIMENTS

The hindered alkenyl phenols are produced according to the synthesis method of the present invention, preferably by starting with the chloromethylphenols of the following structure:

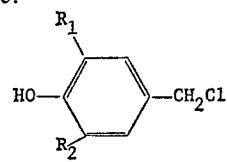

where $R_1$ and $R_2$ are alkyls.
While $R_1$ and $R_2$ may be $C_1$ to $C_8$ alkyls, for effective antioxidant compounds these substituents are preferably tertiary alkyls such as t-butyl. The chloromethyl hindered phenol is then reacted with a t-amine, according to known reactions, to produce the quinone methide structure which is the essential starting material in the synthesis method of the present invention. The quinone methide will have the following structure:

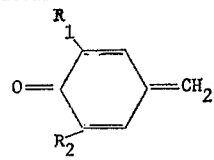

wherein $R_1$ and $R_2$ are alkyls.
The synthesis method of the present invention involves the reaction of the quinone methide with an alkyl or aralkyl Grignard reagent. The preferred alkyl Grignard reagents are the alkylmagnesium bromides or iodides, although the alkylmagnesium chlorides may also be used. The preferred aralkyl Grignard reagents are the aralkyl-magnesium chlorides. The alkyl or aralkyl moiety of the Grignard reagent is selected to produce the desired hindered alkenyl phenol and may be selected from such substituents as benzyl, 1-naphthylmethyl, 9-anthrylmethyl and the $C_1$ to $C_{20}$ alkyls. The reaction of the quinone methide and the Grignard reagent is ordinarily carried out at ambient temperatures and conditions and gives the corresponding 4-alkyl- or aralkylphenol.

The 4-alkyl- or aralkylphenol is then oxidized with potassium ferricyanide. The oxidation step is carried out in the presence of a base, such as potassium hydroxide, in a two-phase system, preferably water and an aprotic organic solvent. The aprotic organic solvents which may be used include petroleum ether, benzene, heptane, or diethyl ether. This reaction may be carried out at ambient temperatures and pressures. A new quinone methide corresponding to the 4-alkyl- or aralkylphenol is produced and is recovered from the organic layer, either by evaporating all of the solvent, or by evaporating a part of the solvent and then cooling the residual solution at a temperature low enough to cause precipitation of the quinone methide. The evaporation may be carried out under vacuum.

The new quinone methide is then reacted with a tertiary amine or a trialkylphosphine to produce the corresponding hindered alkenyl phenol. The tertiary amines may be the trialkyl amines, preferably those having $C_1$ to $C_8$ n-alkyls, such as triethylamine. Suitable trialkylphosphines are those having $C_1$ to $C_8$ n-alkyl groups, such as tri-n-butylphosphine or tri-n-octylphosphine. This reaction is carried out at ambient pressure in an inert organic solvent such as diethyl ether, benzene, heptane, or petroleum ether. Reaction temperatures ranging from room temperature to reflux temperature may be employed. The hindered alkenyl phenol is recovered by conventional means, such as by evaporation of the solvent under vacuum.

The present invention will be further illustrated by the following specific examples which are given by way of illustration and not as limitations on the scope of the invention.

EXAMPLE 1

Preparation of 2,6-di-t-butyl-4-phenethylphenol

A solution of 2,6-di-t-butyl-p-benzoquinone methide was obtained by reaction of 2,6-di-t-butyl-4-chloromethylphenol (20.38 g., 80.0 mmoles) with triethylamine (8.10 g., 80.0 mmoles) in dry ether (500 ml.) according to a procedure described in the literature [W. H. Starnes, Jr., Journal of Organic Chemistry, 31, 3164 (1966)]. This solution was added during 5 minutes with stirring to a Grignard reagent prepared in the usual way from 4.080 g. (0.168 g.-atom) of magnesium, 20.24 g. (160 mmoles) of benzyl chloride, and a crystal of iodine in dry ether (150 ml.). Stirring was continued for 10 minutes at ambient temperature after the addition was complete; then the mixture was stirred under reflux for an additional 20 minutes, cooled, and poured into a large excess of dilute hydrochloric acid. The ether layer was separated, washed twice with sodium bicarbonate solution, dried, and evaporated. Fractionation of the semi-solid residue through a 24-plate spinning band column gave 2.07 g. of unidentified forerun (B.P. 57–160° C. at 1.0–1.2 mm.) and 19.05 g. (77% yield) of pure 2,6-di-t-butyl-4-phenethylphenol as a pale yellow oil (B.P. 160–162° C. at 1.2 mm.) that solidified on cooling, M.P. 54.5–56.5° C. The melting point reported for this compound is 55–56° C. [A. A. Volod'kin, V. V. Ershov, and N. V. Portnykh, Bulletin of the Academy of Sciences of the USSR, Division of Chemical Science, 384, (1967)]. The structure of the compound was confirmed by ir, nmr, and mass spectral analysis.

EXAMPLE 2

Preparation of 4-benzylmethylene-2,6-di-t-butyl-2,5-cyclohexadien-1-one

A solution of potassium ferricyanide (70 g.) and potassium hydroxide (4 g.) in water (275 ml.) was degassed by bubbling with nitrogen and then added rapidly to a well-sitrred, similarly degassed solution of 2,6-di-t-butyl-4-phenethylphenol (5.00 g., 16.1 mmoles) in petroleum ether (B.P. 30–60° C., 50 ml.). Stirring was continued for 1.0 hr. The organic layer was then separated, washed several times with water (final wash had pH=7) dried, and concentrated by evaporation under vacuum. Chilling to −15° C. caused precipitation of pure 4-benzylmethylene - 2,6 - di-t-butyl-2,5-cyclohexadien-1-one (2.27 g., 46% yield) as bright yellow crystals, M.P. 73.5–75.5° C. The structure of the product was established by ir, nmr, and mass spectrometry, and by elemental analysis.

*Analysis.*—Calculated for $C_{22}H_{28}O$ (percent): C, 85.66; H, 9.15. Found (percent): C, 85.91; H, 9.42.

Analysis of the mother liquor by nmr showed that it contained an additional 2.08 g. of the product; thus the total yield was 4.35 g. (88%).

In a similar experiment employing a reaction time of 1.5 hours, 69% of the product, M.P. 72–73.5° C., was isolated.

EXAMPLE 3

Preparation of trans-3,5-di-t-butyl-4-stilbenol

A solution of 4-benzylmethylene-2,6-di-t-butyl-2,5-cyclohexadien-1-one (5.00 g.) and triethylamine (0.10 ml.) in benzene (15 ml.) was kept at room temperature for 9.3 hours and then evaporated under vacuum to recover trans-3,5-di-t-butyl-4-stilbenol in quantitative yield as a pale brown solid, M.P. 89–91° C. Three recrystallizations of the product from aqueous methanol gave white granules, M.P. 90–91° C. The structure of the product was established by ir, nmr, and mass spectrometry, and by elemental analysis.

*Analysis.*—Calculated for $C_{22}H_{28}O$ (percent): C, 85.66; H, 9.15. Found (percent): C, 85.71; H, 9.34.

In another experiment, tri-n-butylphosphine was used instead of triethylamine. This experiment also afforded trans-3,5-di-t-butyl-4-stilbenol in quantitative yield.

EXAMPLE 4

Preparation of 2,6-di-t-butyl-4-n-octylphenol

A freshly prepared solution of 2,6-di-t-butyl-p-benzoquinone methide, obtained in the usual way by reaction of 2 6-di-t-butyl-4-chloromethylphenol (10.19 g., 40.0 mmoles) with triethylamine (4.05 g., 40.0 mmoles) in anhydrous ether (250) ml.), was added during 11 minutes with stirring under nitrogen to a Grignard reagent prepared in the conventional manner from 1.459 g. (60.0 mg.-atoms) of magnesium and 10.75 g. (60.0 mmoles) of 1-bromoheptane in dry ether (75 ml.). After completion of the addition, the mixture was stirred at ambient temperature for 100 minutes, refluxed for 30 minutes, and then poured into a large excess of dilute hydrochloric acid. The ether layer was separated, washed twice with aqueous sodium bicarbonate, dried over Drierite, and evaporated under vacuum. Fractionation of the residue through a 24-plate spinning band column gave a forerun, B.P. 54–121° C. at 0.40–0.35 mm., which was shown by glpc analysis to contain 0.25 g. of 2,6-di-t-butyl-4-n-octylphenol, and a fraction, B.P. 142–143° C. at 0.30 mm., which weighed 8.21 g. and was shown to be the same phenol containing no detectable impurities (total yield=8.46 g., or 66% of theory). The structure of the product was rigorously proven by various spectral methods.

EXAMPLE 5

Preparation of 4-n-octylidene-2,6-di-t-butyl-2,5-cyclohexadien-1-one

A solution of potassium ferricyanide (42 g.) and potassium hydroxide (2.4 g. in water (165 ml.) was degassed by bubbling with nitrogen and then added rapidly to a well-stirred, similarly degassed solution of 2,6-di-t-butyl-4-n-octylphenol (3.00 g., 9.42 mmoles) in petroleum ether (B.P. 30–60° C., 30 ml.). Stirring was continued for 1.7 hours; then the mixture was allowed to stand undisturbed under nitrogen for 2 days. After adding ethyl ether (100–

200 ml.) to replace the petroleum ether which had evaporated, the organic layer was separated, washed three times with water (final wash had pH=7.0), dried with Drierite, and evaporated under vacuum to recover 2.94 g. (99%) of an orange oil which was shown by nmr analysis to be essentially pure 4 - n-octylidene-2,6-di-t-butyl-2,5-cyclohexadien-1-one.

EXAMPLE 6

Preparation of 2,6-di-t-butyl-4-(1-octen-1-yl)phenol

A solution of the crude 4-n-octylidene-2,6-di-t-butyl-2,5-cyclohexadien-1-one (2.00 g., prepared as described in the preceding example) and triethylamine (0.50 ml.) in dry benzene (5 ml.) was heated under reflux in a nitrogen atmosphere for 15.6 hours and then evaporated under vacuum. Analysis of the residual oil by means of various spectrometric techniques showed that it contained a considerable amount of 2,6-di-t-butyl-4-(1-octen-1-yl)phenol.

The hindered alkenyl phenols which are synthesized according to the present invention may be used as stabilizers in polyolefins. When used as stabilizers in polyolefins, the hindered alkenyl phenols may be used with a sulfur-containing costabilizer compound exemplified by the thio esters such as dilauryl thiodipropionate, distearyl thiodipropionate, dilauryl sulfoxydipropionate, distearyl trithiodipropionate, and other sulfur-containing compounds such as dicetyl sulfide, dicetyl disulfide and the like. The hindered alkenyl phenols as well as the sulfur-containing costabilizer compounds may be used in amounts from about 0.05 to about 1% by weight, with a preferred amount from about 0.1 to 0.5% by weight. The polyolefin polymers which may be stabilized are polymers of olefins having 2 to 8 carbon atoms in the molecule and may suitably be exemplified by polyethylene, polypropylene, ethylene-propylene copolymers, ethylene - butene-1 copolymers, ethylene-pentene-1 copolymers and the like having molecular weights in the range from about 10,000 to about 1,000,000. These polymers are produced by polymerization of the corresponding olefins employing the Ziegler-type polymerization catalyst.

To illustrate the antioxidant properties of the hindered alkenyl phenols of the present invention, trans-3,5-di-t-butyl-4-stilbenol is compared with two commercial inhibitors. In Table I below, the data show that the compound synthesized according to the present invention in accordance with Example 3 is a superior antioxidant in a single-compound system, as well as in a synergistic system containing a thioester.

TABLE I.—POLYPROPYLENE STABILITY DATA

| Stabilizer | Weight percent | Days to failure [a] at 115.5° C. |
|---|---|---|
| 3,5-di-t-butyl-4-stilbenol [b] | 0.5 | 17 |
| Santowhite [c] | 0.5 | 8 |
| Ionol [d] | 0.5 | 5 |
| 3,5-di-t-butyl-4-stilbenol, DLTDP [e] | 0.1, 0.2 | 33 |
| Ionol, DLTDP | 0.1, 0.2 | 20 |

[a] For 62-mil plaques in a forced-draft circulating air oven.
[b] Trans isomer.
[c] 1,1-bis(4-hydroxy-2-methyl-5-t-butylphenyl)butane.
[d] 2,6-di-t-butyl-p-cresol.
[e] Dilauryl 3,3'-thiodipropionate.

The nature and objects of the present invention having been completely described and illustrated, what I wish to claim as new and useful and secure by Letters Patent is:

1. A process for producing a hindered alkenyl phenol which comprises:
   reacting in an inert solvent at a temperature ranging from room to reflux temperature a quinone methide of the structure:

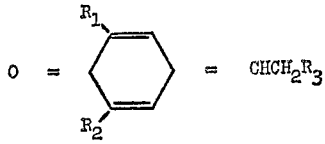

where
   $R_1$ and $R_2$ are alkyls having 1 to 8 carbon atoms and
   $R_3$ is selected from the group consisting of alkyl or aryl
with a compound selected from the group consisting of a trialkylphosphine and a tertiary alkyl amine, said latter alkyl groups having 1 to 8 carbon atoms.

2. A process according to claim 1 wherein said quinone methide is reacted with a trialkylphosphine.

3. A process according to claim 1 wherein said quinone methide is reacted with a tertiary alkyl amine.

4. A process according to claim 2 wherein the alkyl group of said trialkylphosphine is a n-alkyl.

5. A process according to claim 3 wherein the alkyl group is a n-alkyl in said tertiary alkyl amine.

6. A process according to claim 1 wherein said quinone methide has a structure where $R_3$ is a $C_1$ to $C_{20}$ alkyl.

7. A process according to claim 1 wherein said quinone methide has a structure where $R_3$ is an aryl.

References Cited

UNITED STATES PATENTS 3,562,338   2/1971   Zaweski _____ 260—620

OTHER REFERENCES

Bader: Jour. Amer. Chem. Soc., vol. 78 (1956), pages 1709–1713.

Nickon et al.: Jour. Org. Chem., vol. 29 (1964), pages 3014–3021.

BERNARD HELFIN, Primary Examiner

U.S. Cl. X.R.

260—624 B, 624 R, 45.95, 396 N